United States Patent [19]

Huber

[11] 4,390,239
[45] Jun. 28, 1983

[54] PROJECTION SCREEN

[75] Inventor: Erich Huber, Schönberg, Fed. Rep. of Germany

[73] Assignee: Johannes Heidenhain GmbH, Traunreut, Fed. Rep. of Germany

[21] Appl. No.: 262,992

[22] Filed: May 12, 1981

[30] Foreign Application Priority Data

May 14, 1980 [DE] Fed. Rep. of Germany ....... 3018449

[51] Int. Cl.$^3$ ............................................. G03B 21/56
[52] U.S. Cl. .................................... 350/120; 350/127
[58] Field of Search ............................. 350/120, 127

[56] References Cited

U.S. PATENT DOCUMENTS 2,588,373 3/1952 Erban .................................. 350/127
2,780,136 2/1957 Erban .................................. 350/120

FOREIGN PATENT DOCUMENTS 1945486 9/1969 Fed. Rep. of Germany.
2138340 7/1971 Fed. Rep. of Germany.
 592815 5/1945 United Kingdom.
1419945 12/1971 United Kingdom.

Primary Examiner—Richard A. Wintercorn
Attorney, Agent, or Firm—Hume, Clement, Brinks, Willian & Olds, Ltd.

[57] ABSTRACT

An improved projection screen includes a projection lens for projecting a light image on a diffusion plate and apparatus for laterally moving the projection lens relative to the diffusion plate to eliminate undesirable polychromatic shimmer of the projected image. The projection lens may be comprised of two cylindrical Fresnel lenses arranged in stacked relation, with one Fresnel lens having parallel grooves which are arranged in perpendicular relation to parallel grooves of the other Fresnel lens. An alternative embodiment of the invention utilizes a projection lens comprised of a single Fresnel lens having a first set of parallel grooves formed in one of its faces and a second perpendicular set of parallel grooves formed in its opposite face. The projection lens may also be comprised of a spherical Fresnel lens or a cylindrical Fresnel lens with a first set of parallel grooves formed in a projection face and a second set of parallel grooves formed in the same projection face at right angles to the first set. The projection lens of the improved screen may also be comprised of a lens having a spherically reproducing honeycomb structure which forms an array of prisms or lenses.

28 Claims, 8 Drawing Figures

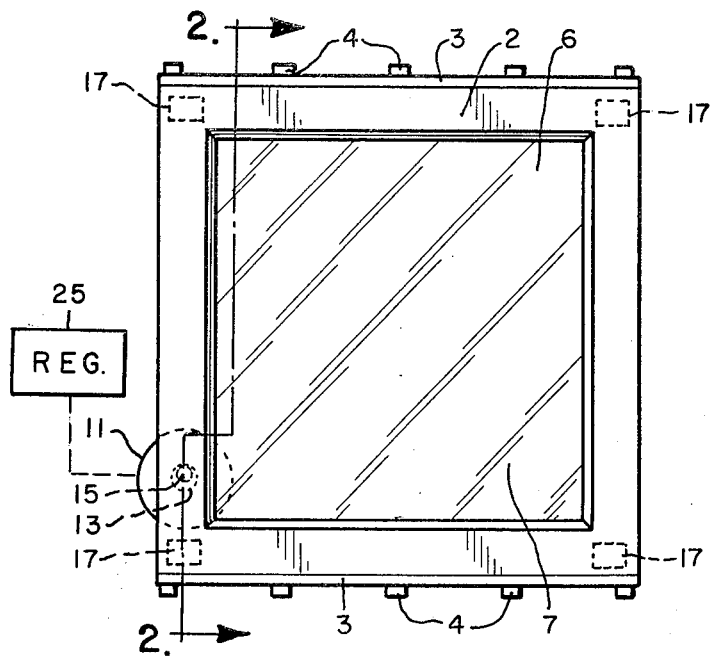
FIG. 1
FIG. 2
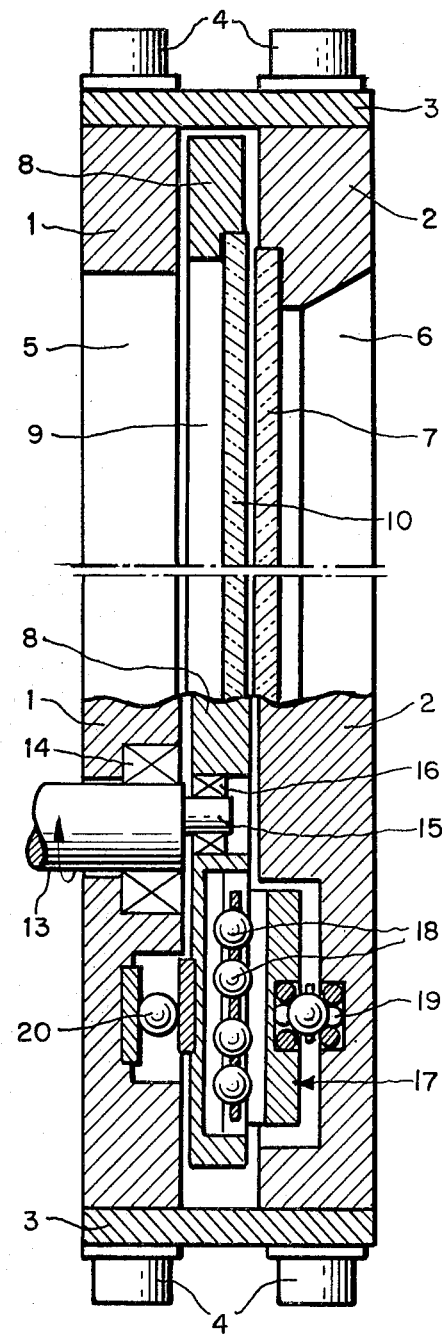
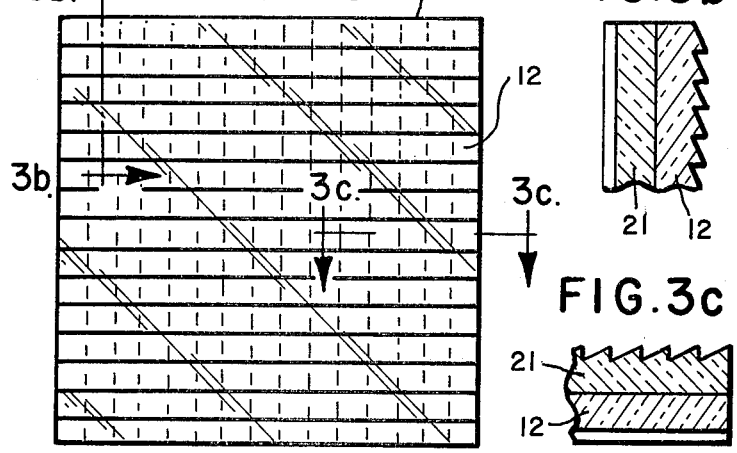
FIG. 3a
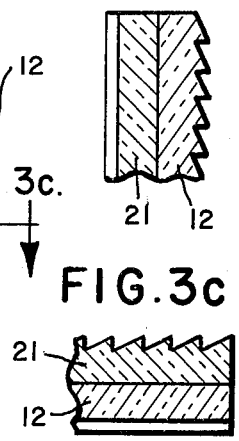
FIG. 3b
FIG. 3c
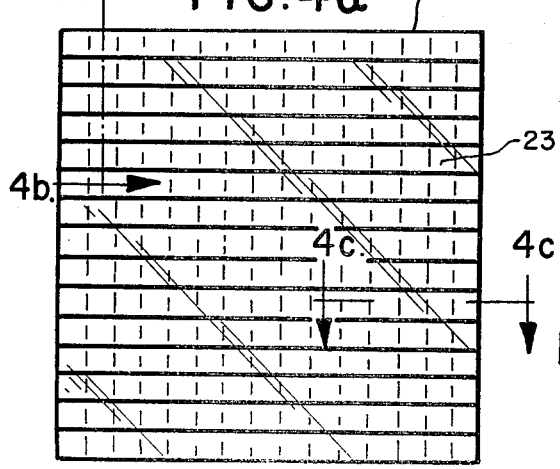
FIG. 4a
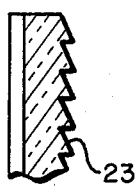
FIG. 4b
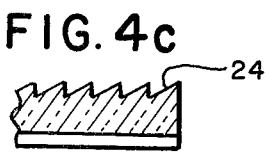
FIG. 4c

PROJECTION SCREEN

TECHNICAL FIELD

The invention relates to a projection screen which is used to display an image projected from an image source. More particularly, the invention relates to an improved projection screen which eliminates polychromatic scintillations of the projected image.

BACKGROUND OF THE INVENTION

It is known that an image may be projected on the rear surface of a translucent projection screen and viewed from the front of the screen. The contrast and definition of the image may be reduced, due to polychromatic scintillations which produce a multicolor-shimmering effect.

It has been suggested that the polychromatic shimmering of a displayed image may be eliminated by rotating a diffusion plate of a projection screen. However, the angular velocity of the plate in the suggested system is undesirably high. In the German patent application No. OS 19 45 486, it is suggested that two diffusion plates may be arranged in stacked relation and moved relative to one another to eliminate the shimmer effect. In the disclosed apparatus, the second diffusion plate reduces the amount of light which is projected on the viewing surface of the projection screen and thereby causes an undesirable reduction in the brightness of the image.

Accordingly, it is an object of the invention to provide an improved projection screen in which the polychromatic shimmer of a projected image is eliminated, without undesirably reducing the brightness of the projected image or moving optical elements of the screen with an undesirably high velocity.

A further object of the invention is to provide such an improved projection screen with at least one Fresnel lens for projecting an image on a diffusion plate, and apparatus for moving the lens relative to the diffusion plate.

Another object of the invention is to provide such an improved projection screen wherein the optical element which projects an image on the diffusion plate is comprised of two cylindrical Fresnel lenses supported in stacked relation and oriented perpendicular to one another.

A further object of the invention is to provide an improved projection screen wherein the optical element which projects the image on a diffusion plate is a cylindrical Fresnel lens having parallel grooves on one face which are oriented perpendicular to corresponding parallel grooves on an opposite face.

Another object of the invention is to provide an improved projection screen wherein the optical element which projects an image on a diffusion plate is a Fresnel lens with a first set of parallel grooves formed in its projection face in perpendicular relation to a second series of parallel grooves formed in the face.

A further object of the invention is to provide an improved projection screen wherein the optical element which projects an image on a diffusion plate is a spherical Fresnel lens.

Another object of the invention is to provide an improved projection screen with a projection lens having a spherically reproducing structure for projecting the image on a diffusion plate, and apparatus for moving the lens relative to the diffusion plate.

A further object of the invention is to provide such an improved projection screen wherein the elements of the projection lens are small prisms.

Another object of the invention is to provide such an improved projection screen wherein the elements of the projection lens are small lenses.

A further object of the invention is to provide an improved projection screen wherein an optical element projects an image on a diffusion plate of the screen and bearing guide elements operate to move the optical element relative to the diffusion plate, to eliminate polychromatic shimmering of the image.

These and other objects of the invention will be better understood by reference to the drawings and the following detailed description of preferred embodiments of the invention.

SUMMARY OF THE INVENTION

In order to achieve the objects of the invention and to overcome the problems of the prior art, the improved projection screen of a preferred embodiment of the invention includes a diffusion plate for viewing a light image and at least one Fresnel lens arranged in parallel, stacked relation to the plate for projecting the image on the plate. Bearing guides are arranged to allow a motor with an eccentric shaft to move the Fresnel lens laterally in a plane parallel to the plane of the diffusion plate.

In operation, a light image is projected through the Fresnel lens and onto a rear surface of the diffusion plate. The image is displayed for viewing on the front face of the plate. The lateral movement of the Fresnel lens with respect to the plate eliminates polychromatic shimmering of the image.

The projection lens of an embodiment of the invention may be comprised of two stacked, cylindrical Fresnel lenses with their respective grooves arranged perpendicular to one another. The projection lens of an alternative embodiment of the invention is a single Fresnel lens with a first set of parallel grooves on one face and a second set of parallel grooves formed on an opposite face, and arranged in perpendicular relation to the first set. The projection lens of another embodiment of the invention is a Fresnel lens with a first set of parallel grooves formed on a projection face of the lens and a second set of parallel grooves formed on the same face of the lens, in perpendicular relation to the first set.

Another embodiment of the invention employs a spherical Fresnel lens to project an image on the diffusion plate. The lens which projects the image can have a spherically reproducing honeycomb structure which forms either an array of small prisms or small lenses.

BRIEF DESCRIPTION OF THE DRAWINGS

FIG. 1 illustrates a front elevation view of an improved projection screen, in accordance with the invention.

FIG. 2 illustrates a cross sectional view of the improved projection screen of FIG. 1, taken along a line 2—2.

FIG. 3a illustrates a front elevation view of one embodiment of a Fresnel lens, in accordance with the invention.

FIG. 3b illustrates a partial cross sectional view of the Fresnel lens of FIG. 3a, taken along a line 3b—3b.

FIG. 3c illustrates a partial cross sectional view of the Fresnel lens of FIG. 3a, taken along a line 3c—3c.

FIG. 4a illustrates a front elevation view of an alternative embodiment of a Fresnel lens, in accordance with the invention.

FIG. 4b illustrates a partial cross sectional view of the Fresnel lens of FIG. 4a, taken along a line 4b—4b.

FIG. 4c illustrates a partial cross-sectional view of the Fresnel lens of FIG. 4a, taken along a line 4c—4c.

DETAILED DESCRIPTION OF PREFERRED EMBODIMENTS

FIG. 1 illustrates a front elevation view of an improved projection screen and FIG. 2 illustrates a cross sectional view of the screen of FIG. 1, taken along a line 2—2. As shown in FIG. 2, two rectangular frames 1 and 2 are held in stacked, spaced relation by transverse frame members 3 which are affixed to each of the frames, for example by fasteners 4. The frame 1 has a central open area 5 through which an image may be projected, for example by image projection apparatus that is known in the art. The rectangular frame 2 has a central opening 6 and a diffusion plate 7 which is mounted to cover the opening 6.

A support frame 8 is disposed between the frames 1 and 2. The support frame 8 has a central opening 9 and a diagramatically illustrated projection lens 10 which is mounted to cover the opening 9. The support frame 8 is mounted on a shaft 13 of a motor 11, for movement in two dimensions. The shaft 13 is supported for rotation in bearings 14 and an off-center arm 15 of the shaft is rotatively connected to the support frame 8 by bearings 16.

The support frame 8 is mounted for sliding movement in a plane between the frames 1 and 2 by linear guide assemblies 17. As shown in FIG. 2, each of the assemblies 17 has a linear ball guide 18 which permits a linear up and down sliding movement of the plate 8. A linear ball guide 19, oriented at right angles to the guide 18, is provided to allow a linear sliding movement of the plate 8 in a direction perpendicular to the plane of the drawing of FIG. 2. A counter-bearing 20 is supported between two plates to maintain the lateral positioning of the support frame 8 between the frames 1 and 2, when the support frame slides on the linear ball guides 18 and 19 of the guide assembly 17.

In operation, an image projecting apparatus (not shown) projects an image from the left to the right, with respect to FIG. 2. The light from the projecting apparatus passes through the projection lens 10 and is projected on the diffusion plate 7. The image may be observed on the diffusion plate 7, by looking through the opening 6 of the rectangular frame 2.

If the support frame 8 is stationary while an image is projected on the diffusion plate 7, the image will have an undesirable polychromatic shimmer. The shimmering of the image on the diffusion plate 7 is prevented by moving the support frame 8 and its projection lens 10 relative to the diffusion plate 7.

The support frame 8 is moved laterally in a plane parallel to the diffusion plate 7 by operating the motor 11 to rotate the shaft 13 and to thereby cause the off-center arm 15 to move in a circle. The circular movement of the arm 15 is transmitted to the support frame 8 so that the frame moves laterally in a plane between the frames 1 and 2 in the two directions defined by the linear ball guides 18 and 19. The speed of the lateral movement may be adjusted, for example by a motor speed regulator 25, which is known in the art.

The projection lens has been diagramatically illustrated in FIG. 2 to facilitate a general understanding of the operation of the apparatus of the invention. Thus, as explained above, the projection lens 10 is employed to project an image on the diffusion plate 7 and is moved to eliminate the polychromatic shimmer of the image. Following is a discussion of various lenses which may be employed as a projection lens 10 for operation in the indicated manner.

FIG. 3a illustrates a front elevation view of a Fresnel projection lens 10' that may be made of, for example glass or acrylic plastic. FIG. 3b illustrates a partial cross section of the projection lens 10' of FIG. 3a, taken along a line 3b—3b, and FIG. 3c illustrates a partial cross sectional view of the projection lens taken along a line 3c—3c. As shown in FIGS. 3a-3c, the projection lens is comprised of two cylindrical Fresnel lenses which are arranged in stacked relation. A top cylindrical Fresnel lens 12 has parallel grooves formed therein in a manner known to the art, and a bottom cylindrical Fresnel lens 21 has parallel grooves formed therein, which are perpendicular to the grooves of the top cylindrical lens. The parallel groove structure of each cylindrical lens operates to project a cylindrical reproduction of the image and the stacked Fresnel lenses therefore project perpendicular reproductions of the image on the diffusion plate 7.

FIG. 4a illustrates a front elevation view of an alternative embodiment of a projection lens 10", which may be mounted and operated as shown in FIG. 2. FIG. 4b illustrates a partial cross-sectional view of the Fresnel lens of FIG. 4a, taken along a line 4b—4b, and FIG. 4c illustrates a partial cross-sectional view of the lens, taken along a line 4c—4c. The cylindrical Fresnel lens 10" has parallel grooves formed in its top surface 23. Parallel grooves are also formed in the bottom surface 24 of the lens, in perpendicular relation to the grooves of the surface 23. The cylindrical Fresnel lens of FIGS. 4a-4c will project perpendicular cylindrical reproductions of the image on the diffusion plate 7.

FIGS. 3a-3c and 4a-4c illustrate two preferred embodiments of a projection lens that may be employed in the apparatus of the invention to project an image on a diffusion plate 7 and to eliminate any polychromatic shimmer of the projected image. However, other types of projection lenses may be employed to project an image on the diffusion plate 7 and to move relative to the diffusion plate 7 to eliminate polychromatic shimmer. More particularly, a Fresnel projection lens may be formed so that a first set of parallel grooves and a second set of parallel grooves are arranged in perpendicular relation on one face of the lens. Such a lens would provide the perpendicular cylindrical reproductions described for the lenses of FIGS. 3a-3c and 4a-4c. Alternatively, a spherical Fresnel lens, such as is known in the art, may be employed as a projection lens 10 in the apparatus of FIG. 2.

It should be understood that projection lenses other than Fresnel lenses may be employed to project an image on the diffusion plate 7 and to move relative to the diffusion plate to eliminate polychromatic shimmer. More particularly, a lens may be formed with a spherically reproducing honeycomb structure consisting, for example, of small prisms or lenses. Such a lens may be employed to project an image on the diffusion plate 7 and moved relative to the diffusion plate to eliminate polychromatic shimmer.

It should be understood that a diffusing surface of the diffusion plate 7 preferably faces either a grooved surface of a projection Fresnel lens or the honeycomb-structured surface of a lens having the above-indicated spherically reproducing honeycomb structure. Also, in general, it should be understood that the diffusion plate 7 may be made of, for example glass, and the projection lenses may be made of, for example glass or acrylic plastic. Moreover, although a preferred embodiment of the invention has been described with respect to an apparatus wherein a projection lens moves relative to a stationary diffusion plate, it should be understood that the diffusion plate may be moved with respect to a stationary projection lens, without departing from the invention. It should also be appreciated that it is the relative movement between a diffusion plate and projection lens which eliminates the polychromatic shimmer of an image and therefore, both a projection lens and its associated diffusion plate may be moved to provide the required relative movement.

It should now be understood that the improved projection screen of the invention will operate to eliminate troublesome polychromatic shimmer of an image, without unduly reducing the brightness of the image or requiring an unnecessarily high velocity of frequency of movement for the optical components of the apparatus.

The invention may be embodied in other specific forms without departing from its spirit or essential characteristics. The present embodiments are, therefore, to be considered in all respects as illustrative and not restrictive, the scope of the invention being indicated by the claims rather than by the foregoing description. Accordingly, all changes which come within the meaning and range of the equivalents of the claims are intended to be embraced therein.

I claim:

1. In a projection system of a type wherein a light image is projected for viewing on a diffusion plate, the improvement comprising:
    a projection lens positioned adjacent and in close proximity to said diffusion plate, said projection lens comprising a plurality of lenticular elements; and
    means for providing relative lateral movement between said projection lens and said diffusion plate to eliminate polychromatic shimmer of the image.

2. The invention of claim 1 wherein said projection lens includes at least one Fresnel lens positioned in parallel, stacked relation to said diffusion plate.

3. The invention of claim 1 wherein said projection lens is positioned in parallel, stacked relation to said diffusion plate, the projection lens having spherically reproducing honeycomb structured elements on one face thereof.

4. In a projection system of a type wherein a light image is projected for viewing on a diffusion plate, the improvement comprising:
    a support structure;
    means for mounting the diffusion plate in the support structure;
    at least one Fresnel lens;
    means for mounting the at least one Fresnel lens in the support structure adjacent and in parallel relation to said diffusion plate; and
    means for providing relative lateral movement between said at least one Fresnel lens and said diffusion plate to eliminate polychromatic shimmer of the image.

5. The invention of claim 4 wherein said at least one Fresnel lens is a spherical Fresnel lens.

6. The invention of claim 4 including two cylindrical Fresnel lenses positioned in stacked relation, perpendicular to one another.

7. The invention of claim 4 wherein said at least one Fresnel lens has a plurality of parallel grooves formed on one lens face and a plurality of parallel grooves formed on an opposite lens face, the grooves of the faces oriented in perpendicular relation.

8. The invention of claim 4 wherein said at least one Fresnel lens has a first plurality of parallel grooves formed on one lens face and a second plurality of parallel grooves formed on said one face in perpendicular relation to the first plurality of grooves.

9. The invention of claim 4 wherein said means for providing relative movement includes means for laterally moving said at least one Fresnel lens relative to a frame included in the support structure, and wherein the means for mounting the diffusion plate comprises means for fixedly mounting the diffusion plate to the frame.

10. The invention of claim 4 wherein said means for providing relative movement includes means for periodically translating said at least one Fresnel lens in two dimensions with respect to the support structure and the diffusion plate.

11. The invention of claim 4, wherein said means for providing relative movement includes means for moving said at least one Fresnel lens in an eccentric rotational path parallel to said diffusion plate with respect to the support structure and the diffusion plate.

12. The invention of claim 4, wherein said at least one Fresnel lens is a spherical Fresnel lens and said means for providing relative movement include means for moving the spherical Fresnel lens in an eccentric rotational path parallel to said diffusion plate.

13. The invention of claim 4 wherein said diffusion plate has a diffusion surface, said at least one Fresnel lens has at least one grooved surface and the diffusing surface is oriented to face the grooved surface.

14. The invention of claim 4 wherein said at least one Fresnel lens is made of glass or acrylic plastic and said diffusion plate is made of glass.

15. The invention of claim 4, wherein said means for providing relative lateral movement includes means for regulating the speed of the movement.

16. In a projection system of a type wherein a light image is projected for viewing on a diffusion plate, the improvement comprising:
    a support structure;
    means for mounting the diffusion plate in the support structure;
    a projection lens having spherically reproducing honeycomb structured elements on one face thereof;
    means for mounting the projection lens in the support structure adjacent and in parallel relation to said diffusion plate; and
    means for providing relative lateral movement between said projection lens and said diffusion plate to eliminate polychromatic shimmer of the image.

17. The invention of claim 16 wherein said elements are prisms.

18. The invention of claim 16 wherein said elements are lenses.

19. The invention of claim 16 wherein said means for providing relative movement includes means for laterally moving said projection lens relative to a frame included in the support structure, and wherein the means for mounting the diffusion plate comprises means for fixedly mounting the diffusion plate to the frame.

20. The invention of claim 15 wherein said means for providing relative movement includes means for periodically translating said projection lens in two dimensions with respect to the support structure and the diffusion plate.

21. The invention of claim 16 wherein said means for providing relative movement includes means for moving said projection lens in an eccentric rotational path parallel to said diffusion plate with respect to the support structure and the diffusion plate.

22. The invention of claim 16 wherein said diffusing plate has a diffusing surface and the diffusing surface is oriented to face said elements of the projection lens.

23. The invention of claim 16 wherein said projection lens is made of glass or acrylic plastic and said diffusion plate is made of glass.

24. The invention of claim 16, wherein said means for providing relative lateral movement includes means for regulating the speed of the movement.

25. The invention of claim 4, wherein said at least one Fresnel lens is positioned in front of said diffusion plate in a projection direction, so that the light image is projected first to the at least one Fresnel lens and then to the diffusion plate.

26. The invention of claim 16, wherein said projection lens is positioned in front of said diffusion plate in a projection direction, so that the light image is projected first to the projection lens and then to the diffusion plate.

27. The invention of claim 1 wherein the separation between the projection lens and the diffusion plate is less than the thickness of the diffusion plate.

28. The invention of claim 4 wherein the separation between the Fresnel lens and the diffusion plate in the support structure is less than the thickness of the diffusion plate.

* * * * *